United States Patent
Ng et al.

(10) Patent No.: US 7,460,691 B2
(45) Date of Patent: Dec. 2, 2008

(54) IMAGE PROCESSING TECHNIQUES FOR A VIDEO BASED TRAFFIC MONITORING SYSTEM AND METHODS THEREFOR

(75) Inventors: Yew Liam Ng, Singapore (SG); Kim Siah Ang, Singapore (SG); Chee Chung Chong, Singapore (SG); Ming Kun Gu, Singapore (SG)

(73) Assignee: CET Technologies PTE Ltd, Singapore (SG)

( * ) Notice: Subject to any disclaimer, the term of this patent is extended or adjusted under 35 U.S.C. 154(b) by 43 days.

(21) Appl. No.: 11/504,276

(22) Filed: Aug. 15, 2006

(65) Prior Publication Data
US 2006/0274917 A1 Dec. 7, 2006

Related U.S. Application Data

(62) Division of application No. 10/129,307, filed as application No. PCT/SG99/00115 on Nov. 3, 1999, now abandoned.

(51) Int. Cl.
*G06K 9/00* (2006.01)
(52) U.S. Cl. .................. 382/107; 73/488; 348/154; 356/27; 701/119
(58) Field of Classification Search ................ 382/100, 382/103, 107, 108, 104; 73/488; 348/154, 348/155; 356/27; 701/117–121, 300, 301, 701/302
See application file for complete search history.

(56) References Cited

U.S. PATENT DOCUMENTS

| | | | |
|---|---|---|---|
| 5,161,107 A * | 11/1992 | Mayeaux et al. ............ 701/177 |
| 5,283,573 A | 2/1994 | Takatou et al. |
| 5,296,852 A | 3/1994 | Rathi |
| 5,434,927 A * | 7/1995 | Brady et al. ................. 382/104 |
| 5,590,217 A | 12/1996 | Toyama |
| 5,696,503 A * | 12/1997 | Nasburg ...................... 340/933 |
| 5,761,326 A | 6/1998 | Brady et al. |
| 5,790,403 A * | 8/1998 | Nakayama ................... 701/28 |
| 5,796,611 A * | 8/1998 | Ochiai et al. .................. 702/3 |
| 5,949,331 A * | 9/1999 | Schofield et al. ............ 340/461 |

(Continued)

FOREIGN PATENT DOCUMENTS

EP 0396432 A2 11/1990

(Continued)

*Primary Examiner*—Anand Bhatnagar
(74) *Attorney, Agent, or Firm*—Foley & Lardner LLP

(57) ABSTRACT

The present disclosure relates to a number of inventions directed, generally, to the application of image processing techniques to traffic data acquisition using video images. The inventions reside in a traffic monitoring system, the basic function of which is for traffic data acquisition and incident detection. More specifically, the application of image processing techniques for the detection of vehicle, from sequence of video images, as well as the acquisition of traffic data and detection of traffic incident. In one aspect, the present invention provides a method of processing images received from a video based traffic monitoring system. In another aspect, the present invention is directed to a Region Of Interest (ROI) for detection of a moving vehicle and a further aspect is directed to a method of detecting day or night status in a traffic monitoring system. It's The application of various algorithms to a video based traffic monitoring system is also considered inventive. Other inventive aspects of the present traffic monitoring system are outlined in the claims.

10 Claims, 15 Drawing Sheets

U.S. PATENT DOCUMENTS

| | | | |
|---|---|---|---|
| 5,999,877 A * | 12/1999 | Takahashi et al. | 701/117 |
| 6,466,687 B1 * | 10/2002 | Uppaluri et al. | 382/128 |
| 6,760,061 B1 * | 7/2004 | Glier et al. | 348/149 |
| 2002/0031240 A1 | 3/2002 | Levy et al. | |
| 2002/0126875 A1 * | 9/2002 | Naoi et al. | 382/104 |
| 2003/0103665 A1 * | 6/2003 | Uppaluri et al. | 382/131 |

FOREIGN PATENT DOCUMENTS

EP 807914 11/1997

* cited by examiner

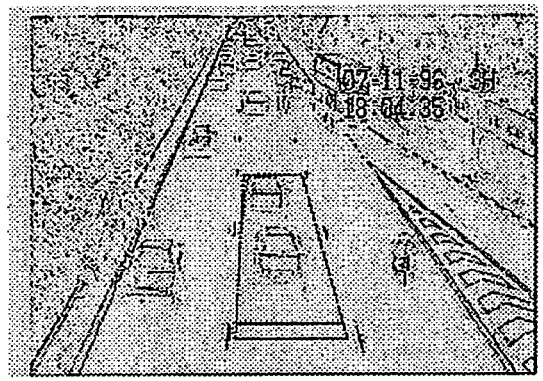
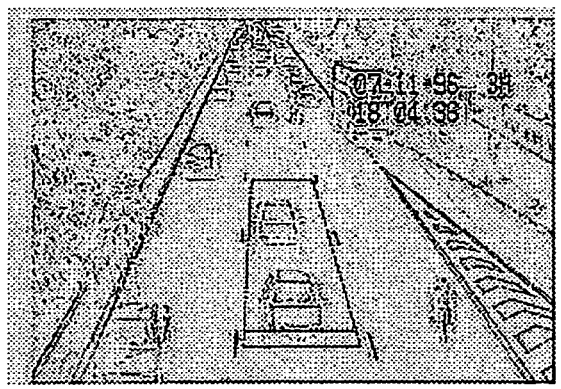
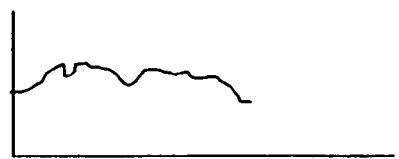
Figure 30            Figure 31
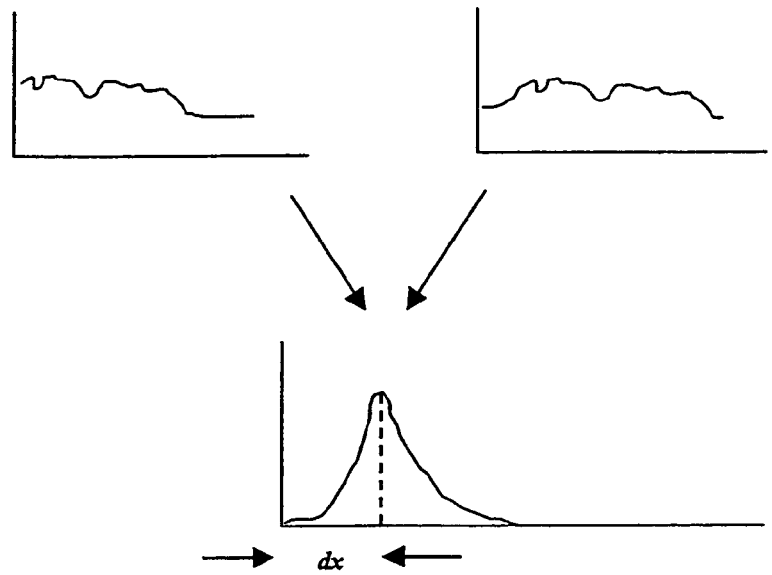
Figure 32

IMAGE PROCESSING TECHNIQUES FOR A VIDEO BASED TRAFFIC MONITORING SYSTEM AND METHODS THEREFOR

CROSS-REFERENCE TO RELATED PATENT APPLICATIONS

This application is a divisional of U.S. patent application Ser. No. 10/129,307, filed May 2, 2002, which is a National Stage Application of PCT/SG99/00115, filed Nov. 3, 1999, both of which are incorporated herein by reference in their entirety.

1. FIELD OF THE INVENTION

The present disclosure relates to a number of inventions directed, generally, to the application of image processing techniques to traffic data acquisition using video images. More specifically, the application of image processing techniques for the detection of vehicle, from sequence of video images, as well as the acquisition of traffic data and detection of traffic incident.

2. BACKGROUND OF THE INVENTION

2.1 Image Processing Techniques for Traffic Analysis

FIG. 1 shows the overview of the operation of a video-based traffic monitoring system. A camera mounted on a structure, such as the streetlight pole, looking over the traffic scene serves as the sensor device for the capturing of traffic images. The captured analogue video images are then transmitted to a processor which converts the analogue video into digital form. The digitized images will then be processed and analyzed for the extraction of traffic information using image processing techniques. The extracted information can then be transmitted to an external user, such as a traffic control center, for traffic monitoring/control.

Generally, application of image processing techniques for video-based traffic monitoring system can be divided into four stages:
1. Image acquisition
2. Digitization
3. Vehicle detection
4. Traffic parameter extraction Stages 1 and 2 are basically the same for most of the existing video based traffic monitoring systems. The fundamental differences between individual systems are in states 3 and 4.

During the vehicle detection process, the input video image is processed whereby the presence of vehicle in the Region of Interest (ROI) is determined. The ROI can be a single pixel, a line of pixels or a cluster of pixels. During the traffic parameter extraction stage, traffic parameters are obtained by comparing the vehicle detection status of the ROI at difference frames (time interval).

2.2 Vehicle Detection

The fundamental requirement of a video-based traffic monitoring system is the capability to detect the presence of vehicle in the ROI. Most video-based traffic monitoring systems employed the background-differencing approach for vehicle detection. This is a process that detects vehicles by subtracting an input image from a background image created in advance. The background image is that one, where only the road section depicted but no vehicle appears, and is served as a reference.

2.2.1 Problem

2.2.1.1 Dynamic update of background scene

The basic requirement for using this method is the need of a background reference image to be generated. The background image must also be constantly updated so as to reflect the dynamic changes in ambient lighting condition of the road section, such as during the transition from day to night and vice-versa. Such variation of light intensity could cause the system to "false trigger" the presence of vehicle. However, the main problem when using the background-differencing approach is the difficulty in obtaining an updated background image if the road section is packed with heavy traffic or the lighting condition changes rapidly. The changes in lighting condition could be due to passing cloud or shadow of the nearby building structure cause by the changes in altitude of the sun.

2.2.1.2 Moving Shadow

Another problem of using the background differencing approach is that during a bright sunny day, vehicle can cast a "moving" shadow onto the next lane, as shown in FIG. 2. This shadow may cause false detection on the affected lane.

2.2.1.3 Night Detection (Headlight Reflection)

One other factor contributing to false detection, when using the background differencing approach, is the headlight of the vehicles at night, as shown in FIG. 3.

2.2.1.4 Detection at Chevron

Detection of a vehicle is generally performed on a roadway where the vehicle is travelling. However, there are circumstances where detection of vehicles at locations, other than the roadway, is required. For example, detection of a stopped vehicle at a shoulder or chevron (region consists of white stripes which occurs mainly at the joining point between entrance/exits and the expressway as shown in FIG. 4). Detection of a vehicle at a shoulder can usually be performed using a similar technique as the detection of a vehicle on the roadway. The detection of a vehicle on the chevron, however, becomes problematic when using the conventional background differencing approach.

The difficulty in detection of a vehicle on the chevron area, as compared to a normal roadway region, is that the background is not homogeneous. When using the conventional background differencing technique, the input image is compared with a background image pixel-by-pixel within the ROI. The comparison output will be high if a vehicle is present. However, when the ROI is within the chevron area, which consists of black and white stripes, a slight movement of the camera will result in a high output even when no vehicle is actually present. When using the edge density information for the detection of vehicle within the chevron region, the detection becomes insensitive. This is because the background edge density of the ROI is relatively high due to the black/white stripes, hence, it becomes difficult to distinguish the vehicle from the background based on the edge density.

2.2.2 Known Solution to Problem

2.2.2.1 Dynamic Update of Background Scene

One solution to update the background image is by looking at different frames in the image sequence. In any one frame, parts of the road are covered by cars. As time goes on, the cars will move and reveal the covered road. If the sequence is long enough, a clear picture of the car-free road can be found. The background image is generated pixel by pixel. The intensity of each point is observed in several initialization frames. The intensity value that occurred most often can be chosen to be the background value at that point. Another approach is by using the interpolation (over several frames) method, in a way it is by taking the average value of the pixel at different frames.

The shortcoming of using these two approaches, however, is that the process of selecting the most often occurred intensity value for each pixel (or the average value) over a sequence of frame can be intensive in computation if the sequence is long. If the sequence is short, it may be difficult to get enough background pixel intensity values in a congested traffic condition. Such dynamic update of the background scene is also not effective if the change of light intensity is too abrupt such as the shadow cast by a moving cloud.

2.2.2.2 Night Detection

When using the background differencing approach for the detection of vehicle in the night, false detection could arise due to problems such as headlight reflection. To overcome such problem, a technique that has been adopted is using the headlight as the indication of the presence of vehicle. The direct approach of using this method is that the vehicle's headlight is detected if a group of pixels' intensity values are greater than its surrounding pixels by a threshold value. The problem of using such technique is that it is difficult to establish the threshold value separating the headlight intensity from the surrounding pixels. Since the absolute intensity values of the headlight and the surrounding pixels can vary dynamically depending on the overall intensity of the road section. It is also computationally intensive to perform such two dimensional search in real time.

2.2.2.3 Day-Night-Transition

Since the night detection employs a different process for the detection of vehicle from that of the day detection. Inevitably, there is the requirement of automated switching from one detection process to another during the transition between day and night. The solution lies in the automatic detection of the day/night status of the traffic scene. However, this can be difficult since the transition between day and night, or vice versa, is gradual. Analyzing the overall average intensity value of the image, to distinguish between day and night, does not provide a reliable solution. This is because in a heavy traffic condition, the headlight of vehicles could significantly increase the overall intensity of the image. One way of avoiding the vehicle headlight is to select a detection region lies "outside" the traffic lane. However, since the traffic scene is an uncontrolled outdoor environment, there is no assurance that the condition of the detection region remains unchanged over a long period of time.

2.3 Traffic Parameters Extraction

During the parameter extraction stage, traffic parameters are extracted by comparing the vehicle detection status of the ROI at difference image frames of different time interval. Traffic parameters, generally, can be divided into two types, traffic data and incident. Depending on the method of parameter extraction employed, generally, the basic traffic data includes vehicle count, speed, vehicle length, average occupancy and others. Using the basic traffic data, other data such as gap-way and density can be easily derived. Traffic incident consists of congestion, stopped vehicle (on traffic lane or shoulder), wrong-direction traffic and others.

2.3.1 Known Solution and Problem

Existing method for the extraction of traffic parameters, generally, includes the window technique (or trip-line) and the tracking technique as shown in FIGS. 5 and 6, respectively.

2.3.1.1 Window Technique and Problem

Using the window technique, the ROI is usually defined as isolated sets of window (rectangular box) as illustrated in FIG. 5. The basic function of each window is for the detection of vehicle and hence counting the number of vehicles. In order to measure the vehicle speed two windows are required. By obtaining the time taken for the vehicle to travel from one window to the other, knowing the physical distance between the two, enable the system to determine the vehicle speed. Then, by obtaining the length of time the detected vehicle present on one window and the vehicle speed will yield the vehicle length. The advantage of the window technique is that it is computationally simple.

Error Due to Frame Rate Resolution

The disadvantages of the window technique is that its accuracy, for length and speed measurement, is affected by the resolution of the processing frame rate and the actual speed of the vehicle. In FIG. 7, vehicle A first activated window x at frame f. At frame f+n, of FIG. 8, vehicle A activates window y. To calculate the vehicle speed, it is assumed that the vehicle had travelled a distance of dw in the time period of n frames. dw is the physical distance between the two windows. However, due to the limited frame rate resolution, the actual distance which vehicle A had travelled is dv (compare FIGS. 7 and 8). Therefore the error rate can be as much as (dv-dw)/dw. The boundary of this error increases as the frame rate decreases.

Error Due to Occlusion

When using two windows for speed measurement, the distance between the two windows must be maximized in order to reduce the error due to frame rate resolution. However, increasing the distance between the two windows will increase the possibility of occlusion at the window to the upper part of the image. The occlusion can be illustrated as shown in FIGS. 9 and 10, which show two successive frames of video images. These two figures also show the typical angle of camera view for traffic data extraction. Due to the error of perspective, vehicle B appeared to be "joined" to vehicle A at frame f of FIG. 9, hence, window x will not be able to detect the time when vehicle B presents (at window x). At frame f+n (FIG. 10), however, window y can successfully detect vehicle B since the error of perspective is minimal at the lower extreme of the image. When window y is used as the counting "sensor", its counting error due to occlusion will be minimized. However, the accuracy of the vehicle speed measurement (and hence vehicle length) will be affected by the occlusion problem at window x. The occlusion will be even more apparent in the event of congestion.

2.3.1.2 Tracking Technique and Problem

When using the tracking technique, a search is first performed along a "tracking zone" of ROI as shown in FIG. 6. When a vehicle is detected, its location is determined. This vehicle will then be tracked, along the tracking zone, in subsequent frames. By tracking the vehicle in each frame, with its location, the vehicle speed is measured. The vehicle length can be measured directly by detecting the front and end of the vehicle.

The advantage of using the tracking method is that it is theoretically more accurate than the window technique in terms of speed measurement. Since the exact location of the tracked vehicle is determined at each frame, accuracy of its speed measurement is, therefore, not affected by the frame rate resolution. The disadvantage of the tracking method, as compare to the window technique, is that it is more intensive in computation. However, with the advance of computer processing power, this shortcoming is becoming less significant.

Error Due to Occlusion

For direct length measurement using the tracking technique, that is by detecting the vehicle's front and end, the vehicle must be isolated from both preceding and succeeding vehicles for at least one frame. However, due to the angle of perspective, it may be difficult to isolate the vehicle from succeeding vehicle such as that shown in FIG. 11 (vehicles A and B). In FIG. 12, thought vehicle A can be isolated from B, its front however is out of the camera field of view, hence, unable to determine its length.

3. SUMMARY OF THE INVENTION

In one aspect, the present invention provides a method of processing images received from a video based traffic monitoring system, the method comprising the steps of:

receiving input from at least one video source, storing at least a portion of the input, forming digital data by applying a digitization process to the input, analysing the data, including analysing the data for detection of a vehicle, associated predetermined parameters and/or analysing the data for detection of a predetermined incident, providing, as an output, information corresponding to the analysis step.

Preferable, the method further includes the step of retrieving the stored input in the event of the analysis detecting the incident.

In another aspect, the present invention provides, in a traffic monitoring system, a Region Of Interest (ROI) for detection of a moving vehicle, the ROI having:

two sections, a profile-speed-zone (PSZ) and a vehicle-detection-window (VDW), the two sections being substantially aligned with a respective lane of traffic to be monitored, the PSZ being used for the extraction of vehicle speed if a vehicle is detected at the VDW, and the VDW being used for the detection of the presence of the vehicle on the window, the VDW partially overlapping the PSZ.

In yet another aspect, there is provided, in a traffic monitoring system, a Region Of Interest (ROI) for detection of a stopped vehicle at shoulder or chevron, the ROI consisting of a vehicle-detection-window (VDW), the VDW being used for the detection of the presence of the vehicle on the window.

A further aspect is directed to a method of detecting day or night status in a traffic monitoring system, as set out in the claims.

Other inventive aspects of the present traffic monitoring system are outlined in the claims.

The present disclosure relates to a number of aspects of a traffic monitoring system. In particular the inventive aspects employ various advanced image processing algorithms for traffic monitoring system using video images. The basic function of the system is for traffic data acquisition and incident detection. The present inventive aspects, generally, focuses on the vehicle detection and traffic parameters extraction processes of the traffic monitoring system.

In essence, during the vehicle detection process, two different image processing techniques are employed for the detection of vehicle in the day and night. For the day-detection, edge-density information is proposed to detect the present of vehicle within the ROI. The advantage of the proposed technique is that it allows the elimination of noise such as headlight reflection. Vehicle's shadow of the neighbouring lane can also be eliminated by taking into consideration the directional edge characteristic of the vehicle's shadow. Using edge-density information, the process becomes more robust under the dynamic ambient lighting condition. For the night-detection, the headlight detection approach is employed for the detection of vehicles. The intensity-profile approach is proposed for the detection of vehicle headlight. Using this approach the system becomes more stable where fault detection due to headlight reflection is minimized. The other advantage of this approach is that it is less intensive in computation. To provide an automatic switching of the detection algorithms between the day and night, we combined the use of the average intensity value as well as the contrast level of the pixels' intensities within the ROI for the detection of day and night.

For the traffic parameter extraction stage, the inventive aspects focus on the acquisition of vehicle count, speed, length as well as time-occupancy for the traffic data extraction since other traffic data such as density, headway and others can be easily derived from these basic traffic data. The traffic data is then used for the detection of various types of traffic incidents. In one aspect of the present invention, a combination of the window and tracking technique is employed for the traffic parameter extraction. Using this approach, measurement errors due to frame-rate resolution as well as occlusion are minimized.

The application of various algorithms to a video based traffic monitoring system is also considered inventive.

4. BRIEF DESCRIPTION OF THE DRAWINGS

Figure 7:
Figure 8:
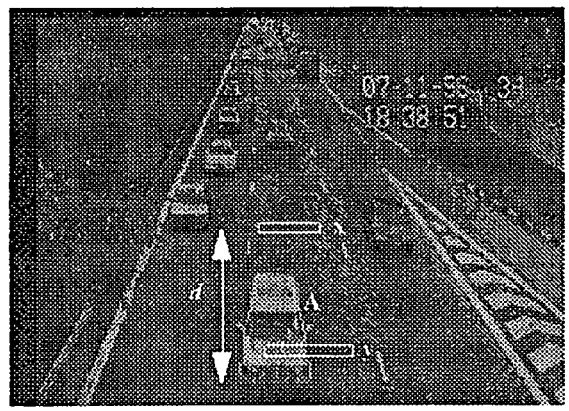
Figure 9:
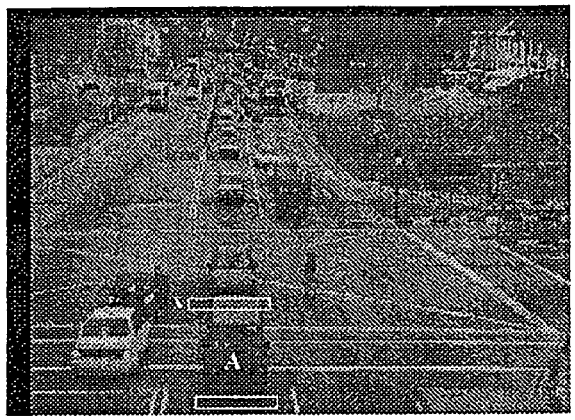
Figure 10:
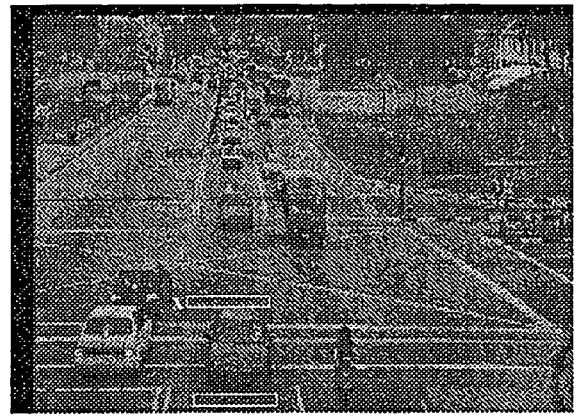
Figure 11:
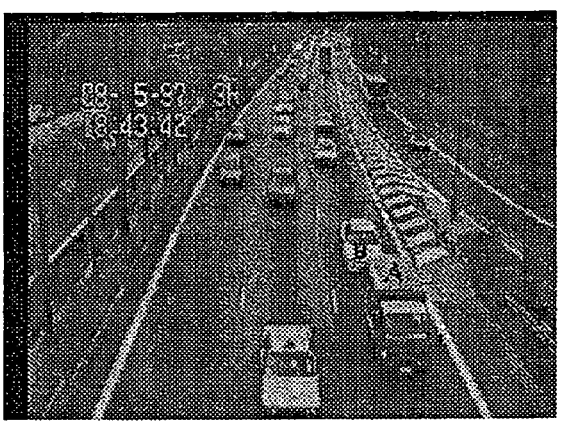
Figure 12:
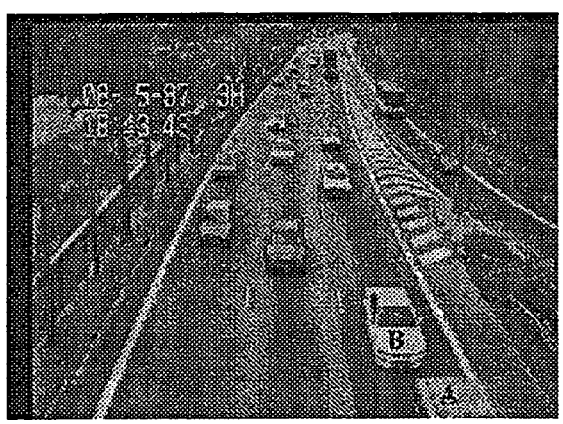
Figure 13:
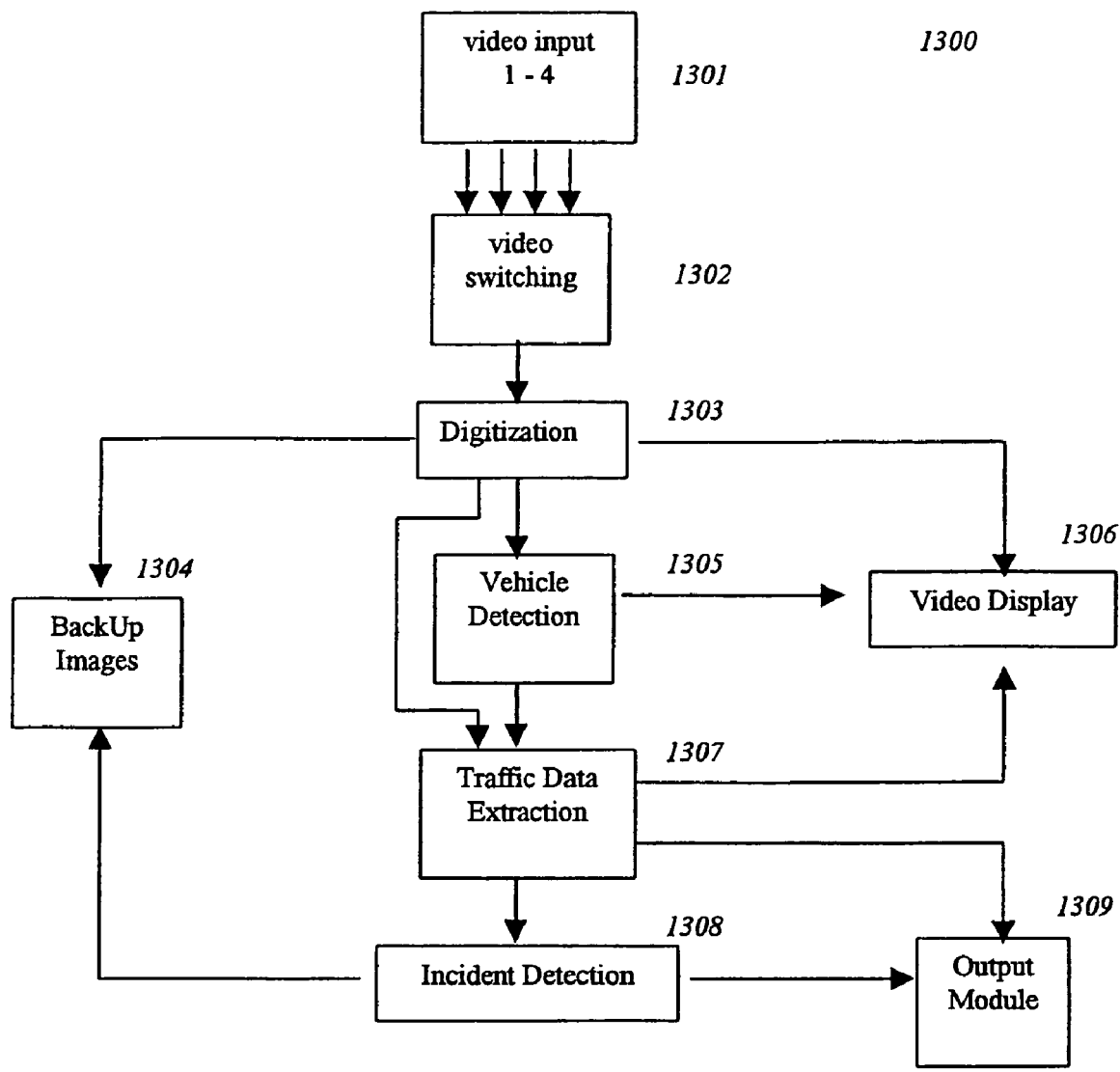

FIG. 7 illustrates the measurement error, of window technique, due to frame-rate resolution—frame f FIG. 8 illustrates the measurement error, of window technique, due to frame-rate resolution—frame f+n FIG. 9 illustrates the speed/length measurement error, of window technique, due to occlusion—frame f FIG. 10 illustrates the speed/length measurement error, of window technique, due to occlusion—frame f+n FIG. 11 illustrates the length measurement error, of tracking technique, due to occlusion—frame f FIG. 12 illustrates the length measurement error, of tracking technique, due to occlusion—frame f+n FIG. 13 is the schematic block diagram of the image processing process for the traffic monitoring system.

Figure 14:
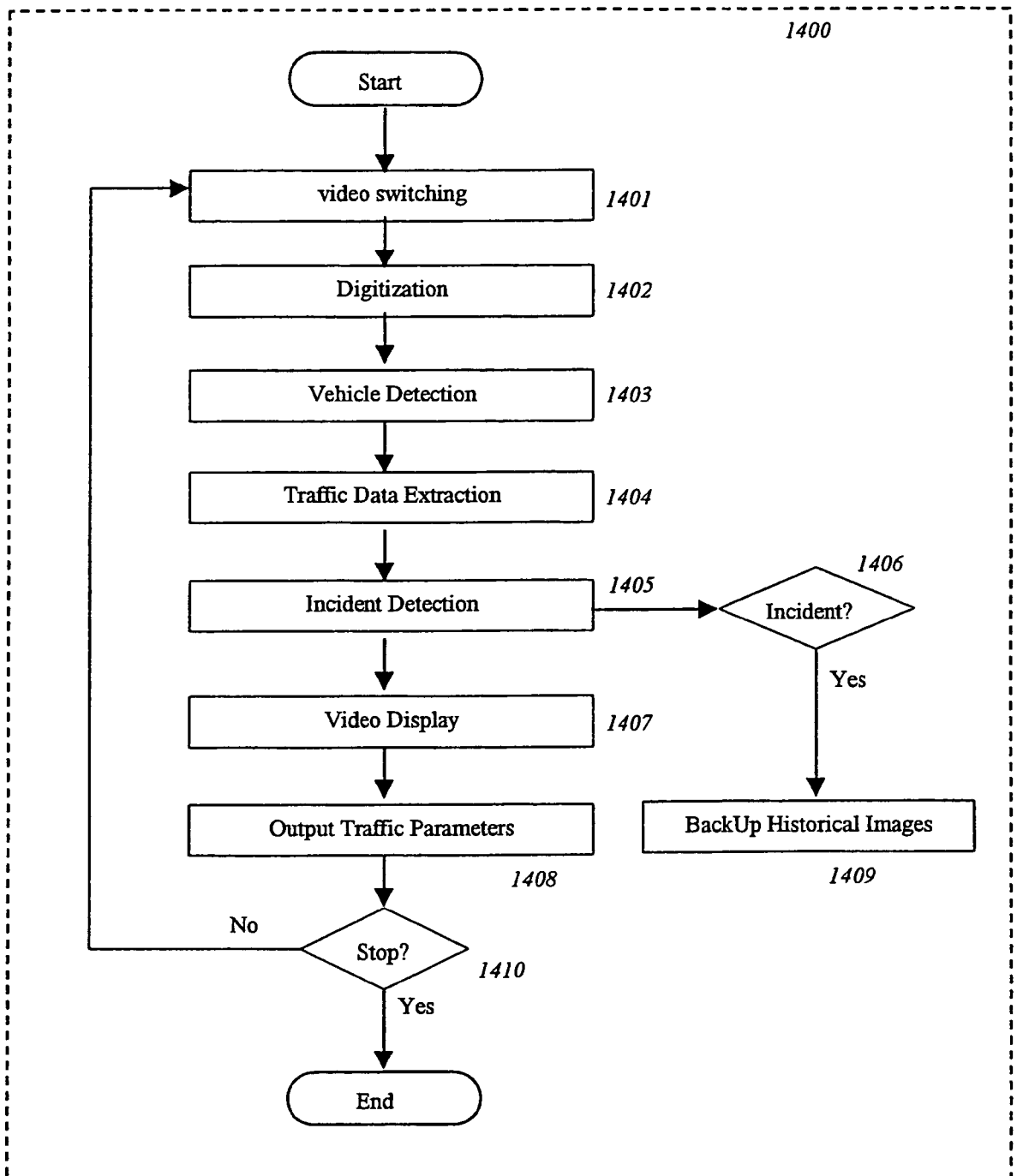

FIG. 14 shows the flow of the image processing process for the traffic monitoring system.

Figure 15:
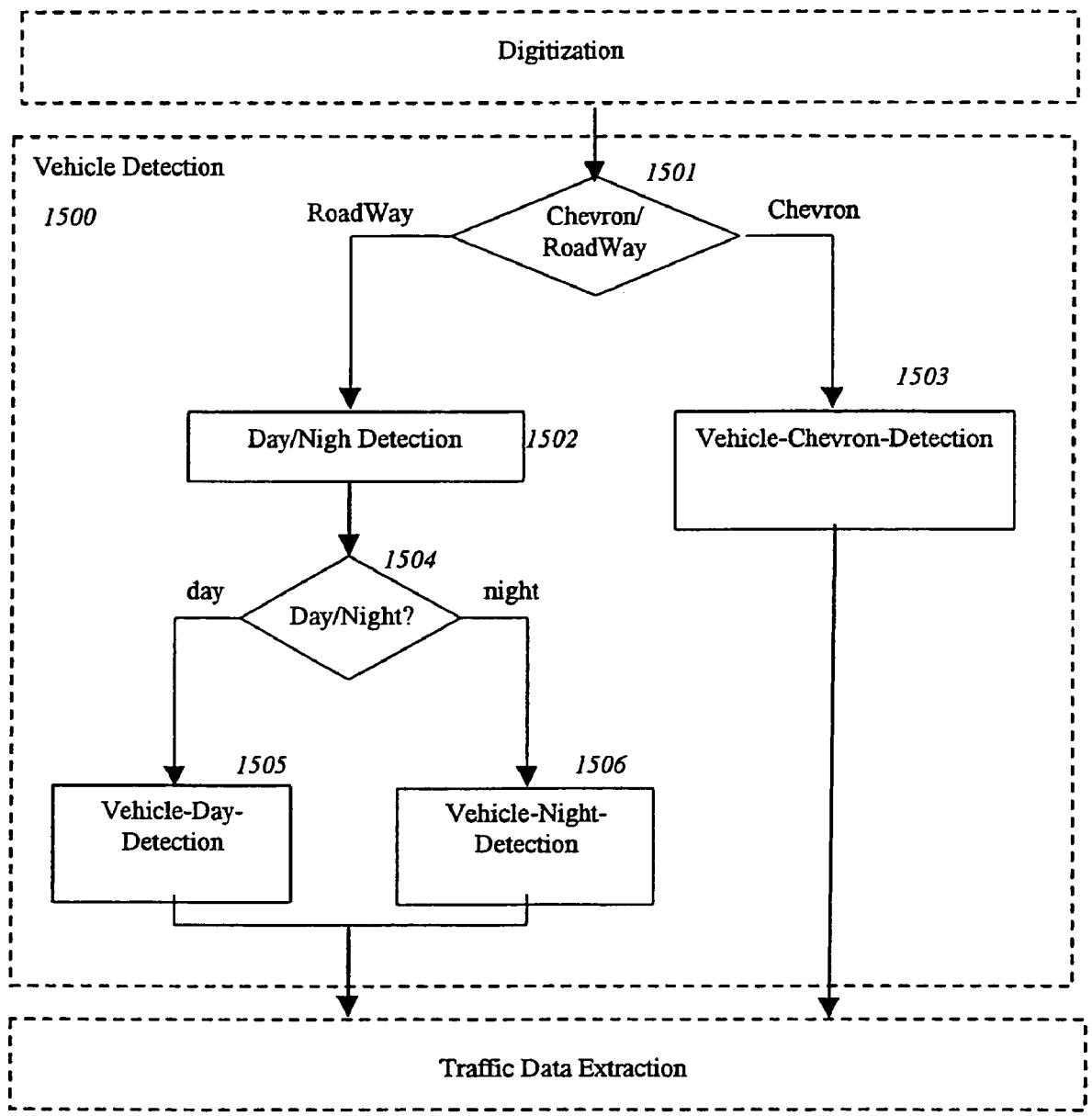

FIG. 15 shows the flow of the vehicle detection process

Figure 16:
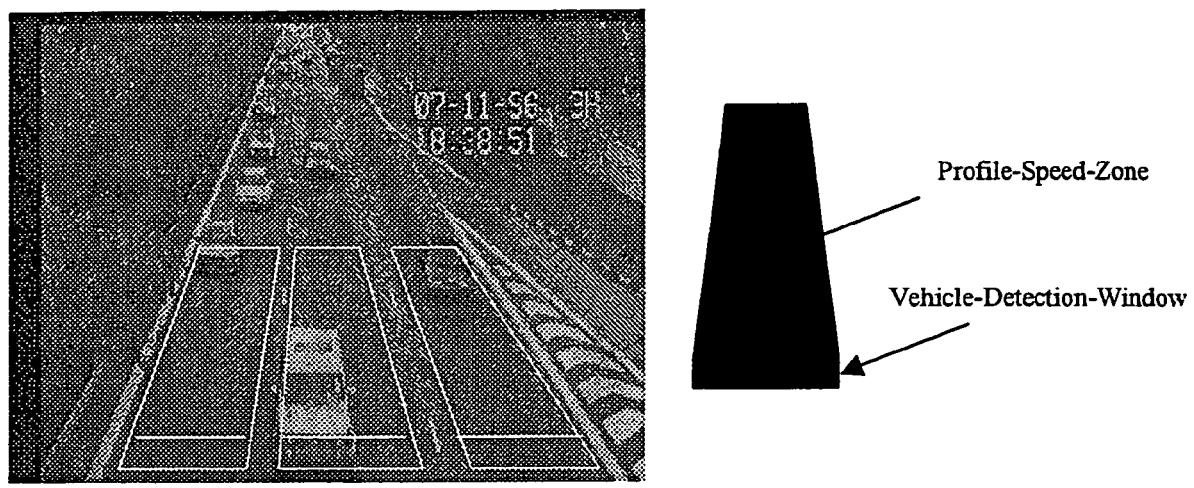
Figure 17:

FIG. 16 illustrates the definition of the ROI adopted in the present invention FIG. 17 shows the ROI where average intensity value and variance of pixels' intensities are obtained for the detection of day/night status of the traffic scene.

Figure 18:
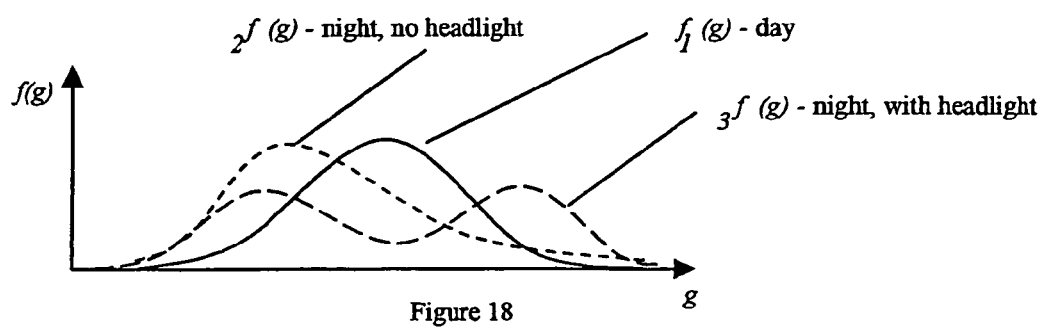

FIG. 18 shows the intensity distribution functions of the ROI for three different traffic conditions.

Figure 19:
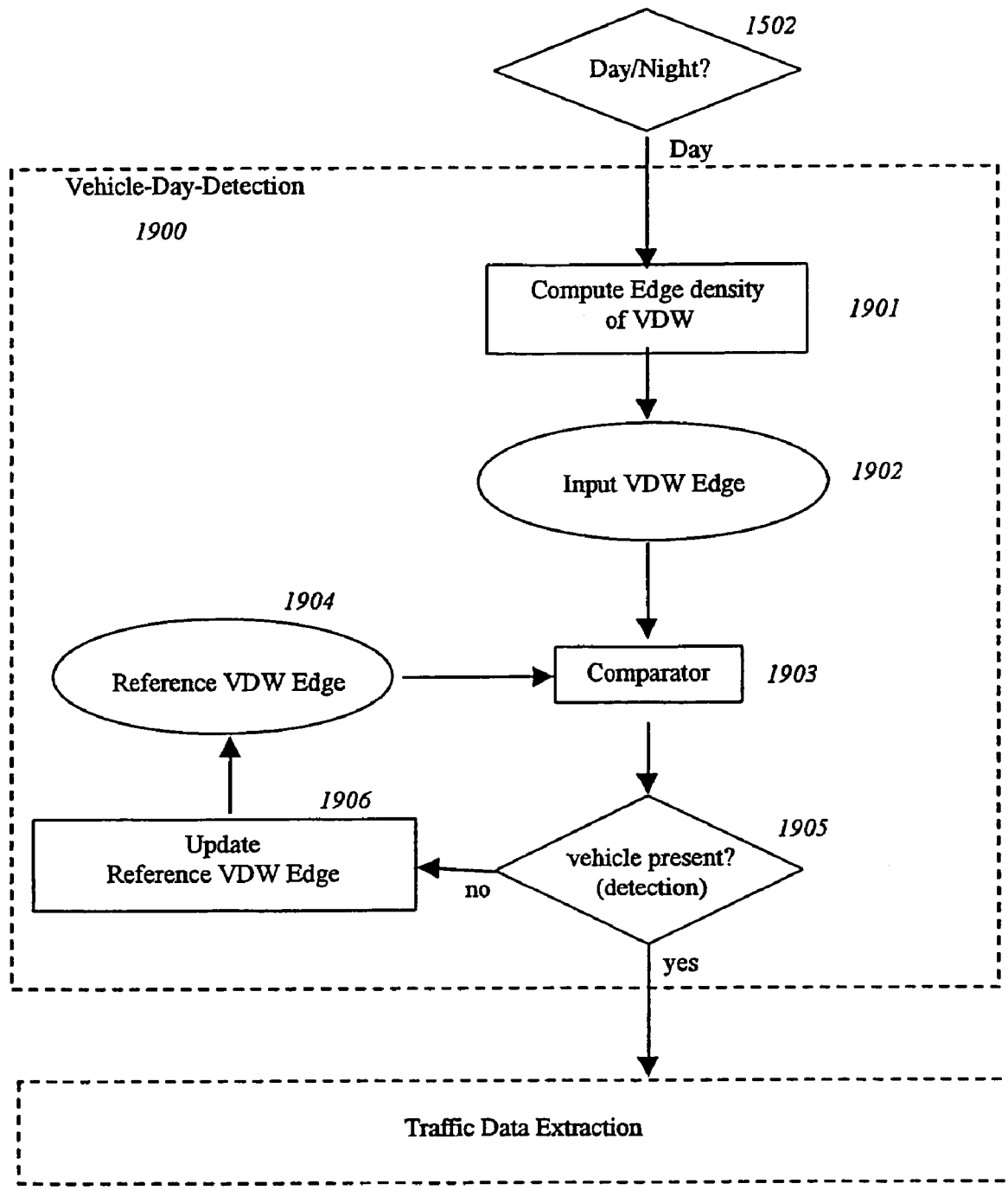

FIG. 19 is the flow diagram for the vehicle-day-detection process

Figure 20:
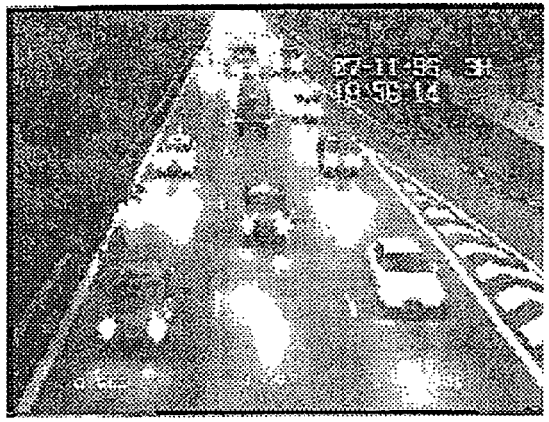

FIG. 20 shows the effect of headlight reflection

Figure 21:
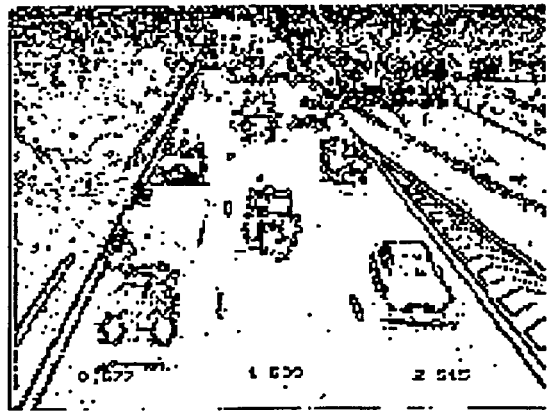
Figure 22:
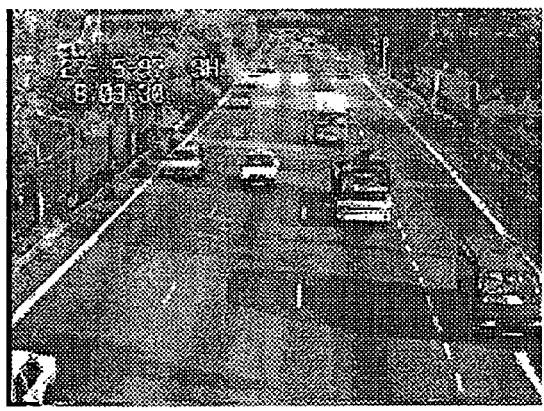
Figure 23:
Figure 24:
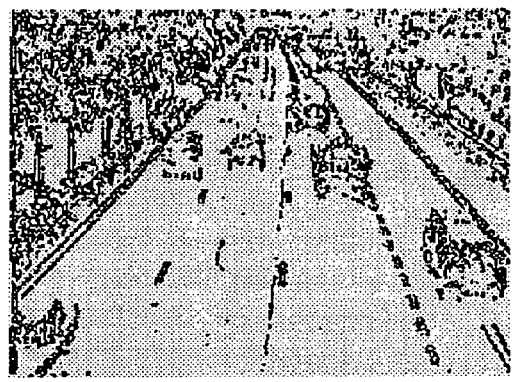

FIG. 21 illustrates the removal of vehicle headlight reflection using the edge density information FIG. 22 shows the effect of moving shadow due to the neighbouring vehicle FIG. 23 shows how moving shadow is reduced when only the edge density is used FIG. 24 shows how the edges due to the shadow's boundaries can be further reduce by using the weighted directional edge information.

Figure 25:
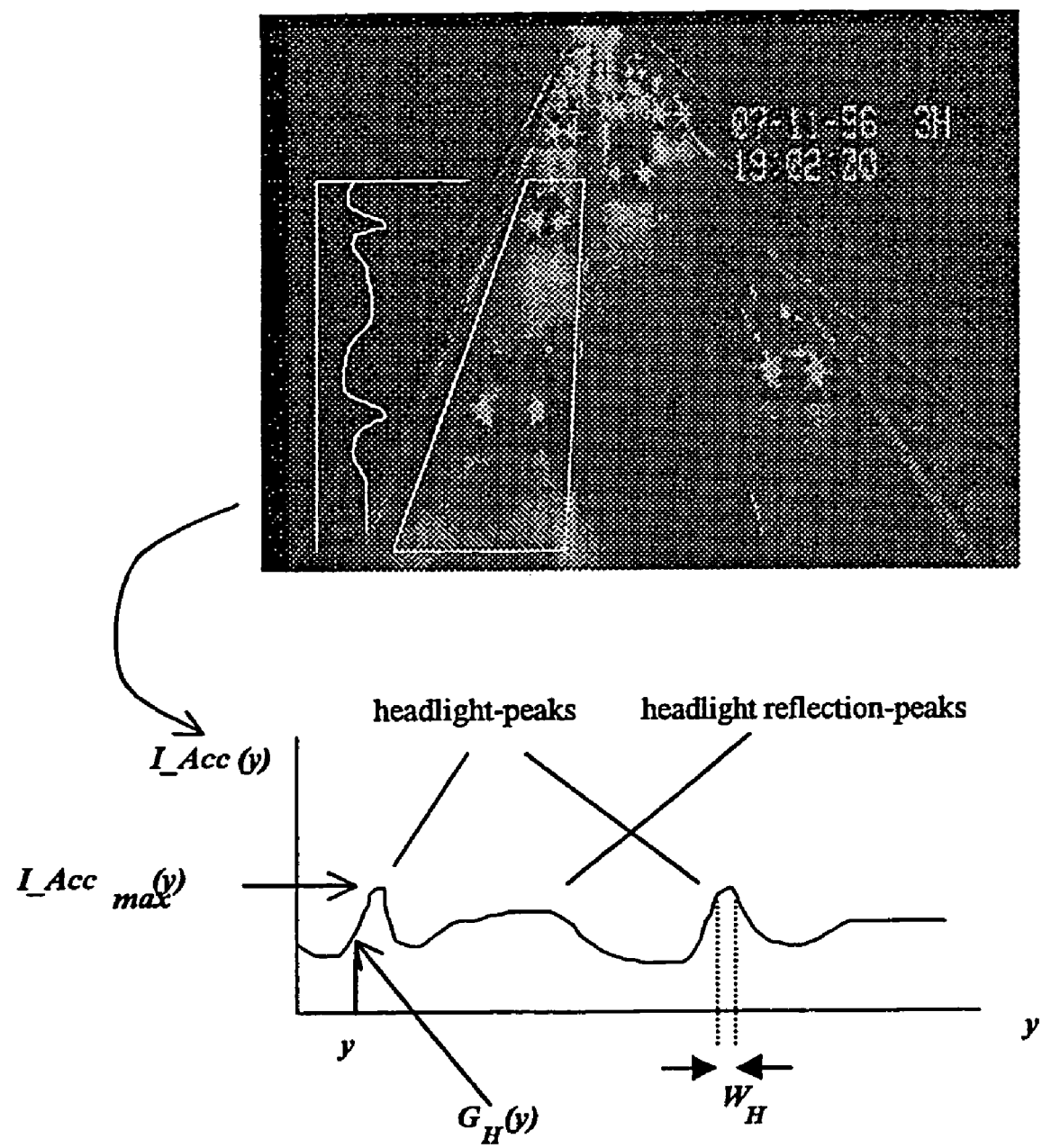

FIG. 25 illustrates the distinct features of the headlight through the projection of the intensity profile of the ROI.

Figure 26:
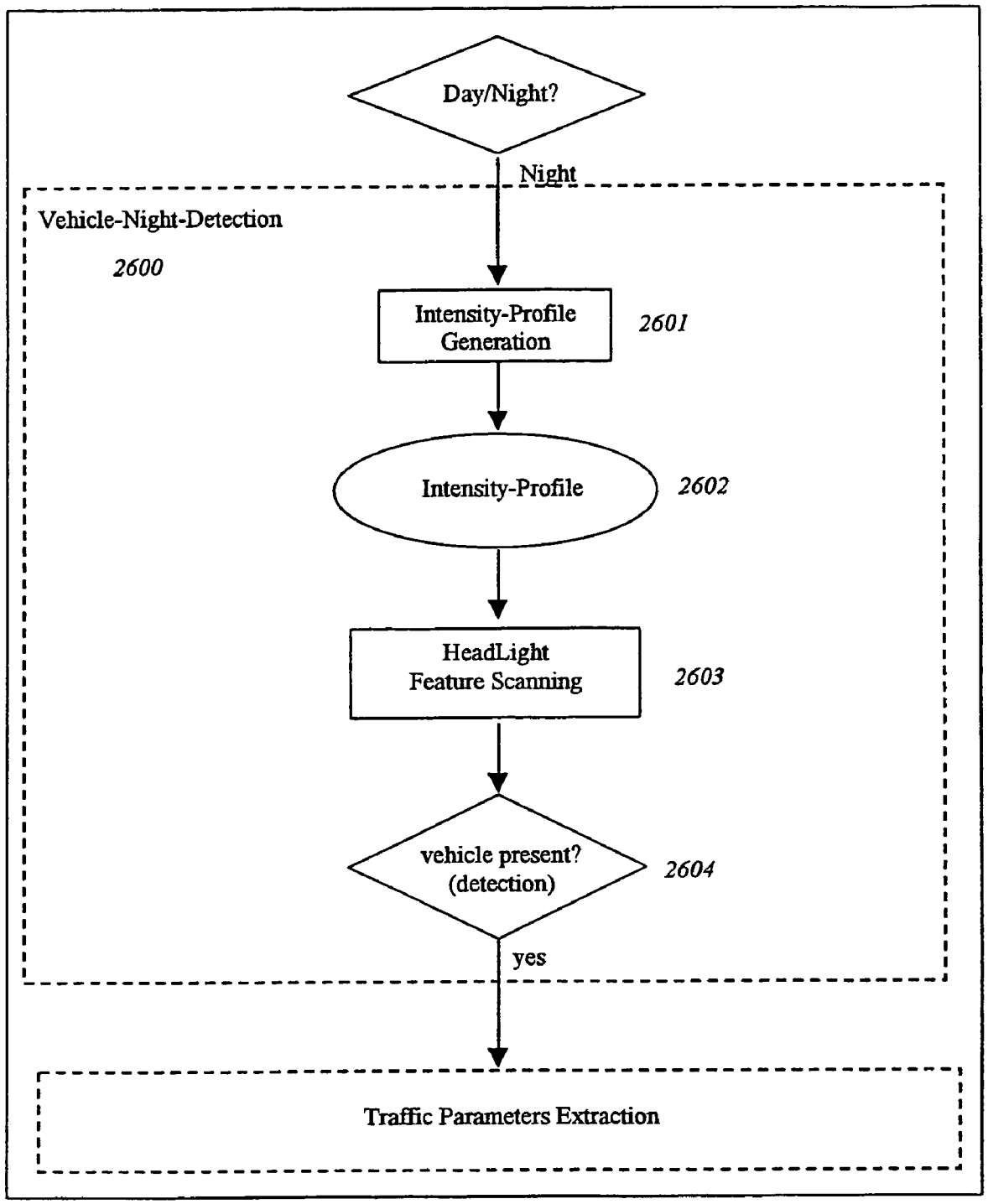

FIG. 26 is the flow diagram for the vehicle-night-detection process

Figure 27:
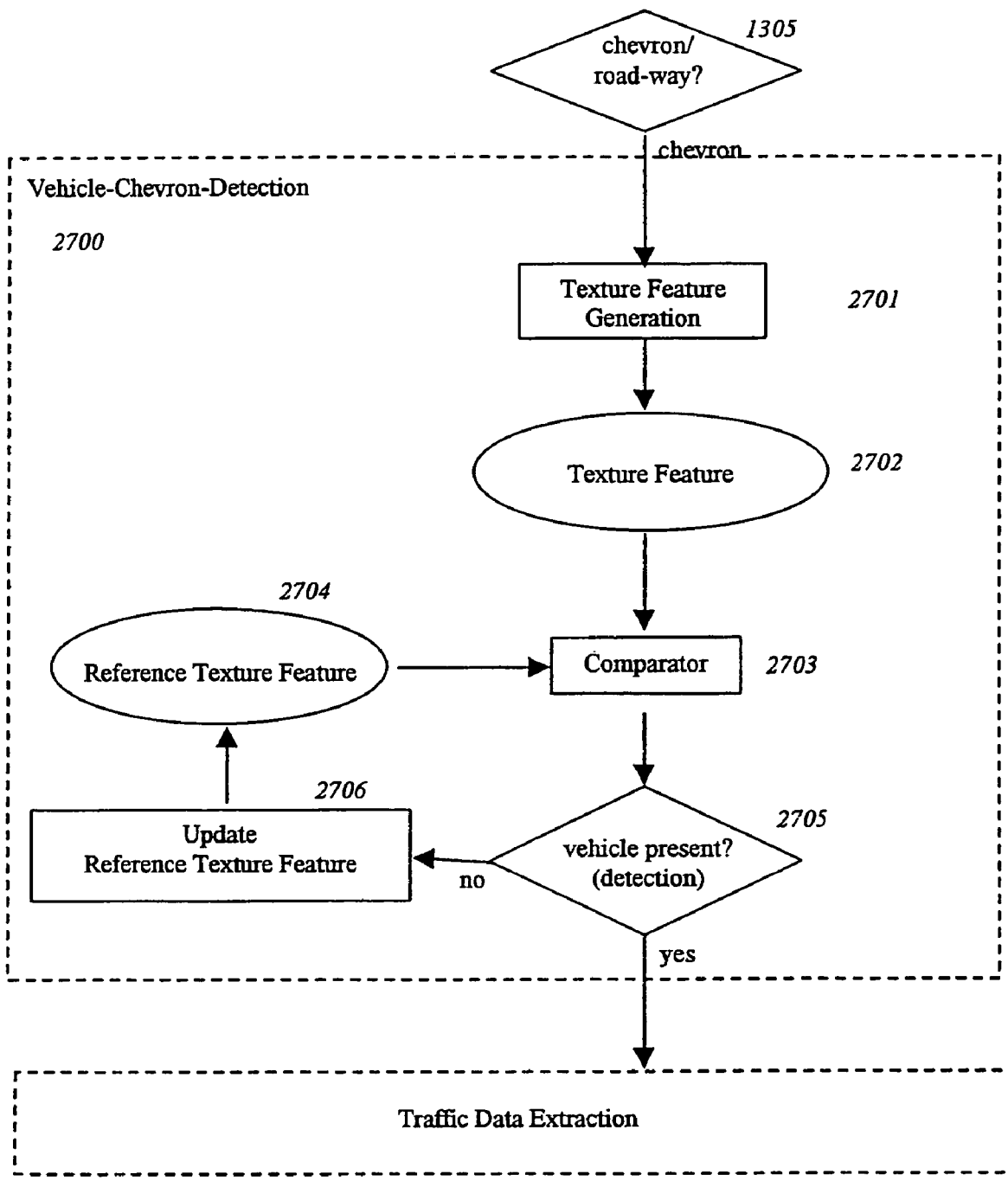

FIG. 27 is the flow diagram for the vehicle-chevron-detection process

Figure 28:
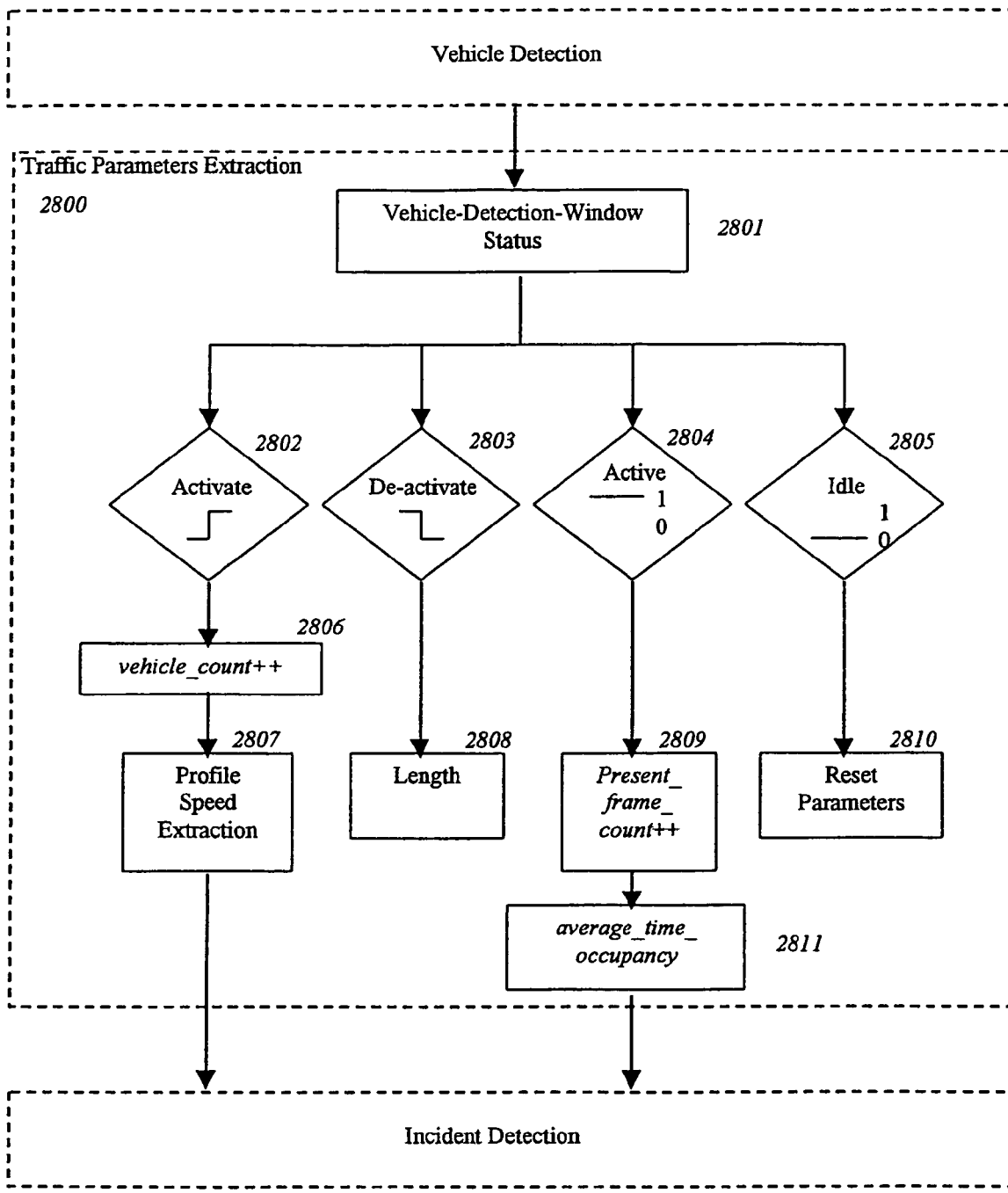

FIG. 28 is the flow diagram of the traffic parameters extraction process

Figure 29:
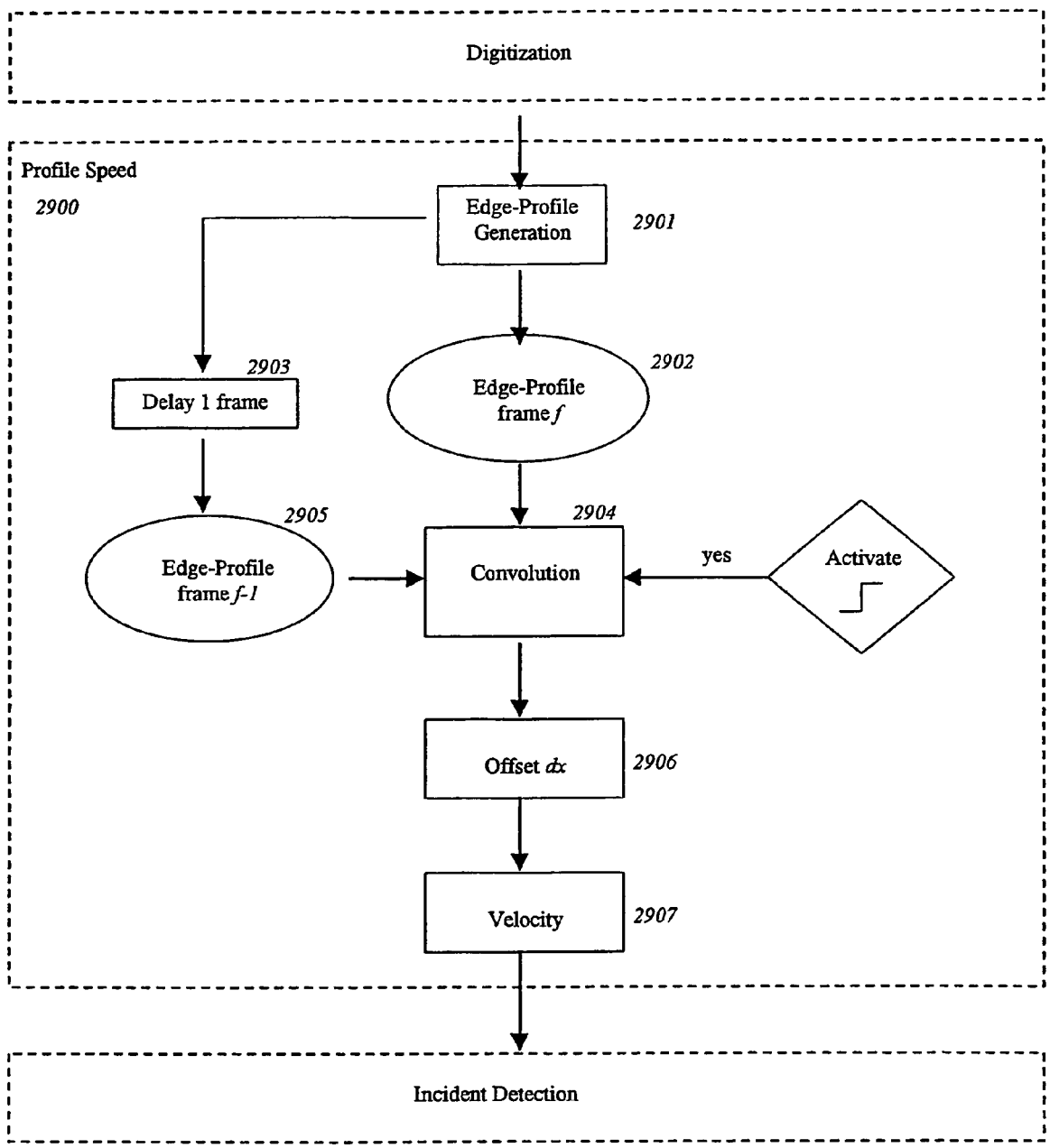

FIG. 29 is the flow diagram of the process to obtain vehicle speed using the technique of profile speed extraction.

FIG. 30 shows the generation of edge profile of the profile-speed-zone at frame f FIG. 31 shows the generation of edge profile of the profile-speed-zone at frame f+1

FIG. 32 illustration the extraction of the vehicle speed through the convolution process of the two edge-profiles obtained at consecutive frames.

5. DETAILED DESCRIPTION OF THE INVENTION

The following detailed description describes the invention, which is particularly well suited for traffic data extraction using video images under dynamic ambient lighting conditions. The description will be divided into three sections. First, the overall system architecture, as well as the flow of the image processing process, of the invention will be described. In the second section, the vehicle detection process of the invention will be described in further detailed. The traffic parameter extraction process will be described in the third section.

5.1 Overall System Architecture

FIG. 13 shows the schematic block diagram of the image processing process 1300 for the traffic monitoring system. The system is capable of processing upto four video inputs, hence providing simultaneous monitoring of four traffic sites. Video switching module 1302 is responsible to multiplex between four video inputs. During the digitization process 1303, the video signal will be digitized for subsequent processing. At module 1305, the digitized image will be processed for the detection of vehicle at ROIs. Upon the detection of a vehicle at module 1307, traffic data will be extracted based on the detection status at different image frames. Occurrence of traffic incident can then be deduced based on the extracted traffic data at module 1308. The extracted traffic parameters (traffic data and incident) can then be output to an output module 1309.

At module 1304, sequence of digitized images will be compressed into smaller images and stored in a set of backup-image-memory. The backup-image-memory has a fixed memory size which can store a fixed number of, say n, images for each of the video input. The image memory is constantly being updated with the latest input image. Such that at any one time the last n images, of the video input, are always stored in the backup-image-memory. The function of this backup-image module is such that when a traffic incident is detected, the backup process will be interrupted. Such that the backup images can then be retrieved for analysis and visual inspection of the traffic images prior to the occurrence of incident.

At module 1306, various traffic information such as traffic images, processed images, traffic parameters and etc. can be stored onto the display memory for video output. One technical advantage of this feature is that it allows all the four digitized images, from four different video sources, to be incorporated into one display video output. Hence, enable four video input images to be transmitted via only one transmission line.

FIG. 14 illustrates the flow of the image processing process of the monitoring system, as designated by reference numeral 1400's but with explanation of each step corresponding to the 1300's module described above.

5.2. Vehicle Detection Process

Due to the different background characteristics of the roadway and chevron region as well as day and night conditions, it is difficult to perform vehicle detection for different conditions using one detection technique. Three different vehicle detection techniques are adopted in the invention, namely, the vehicle-day-detection, vehicle-night-detection and the vehicle-chevron-detection. One for the detection of vehicle on a normal roadway in the day, one for normal roadway in the night and the other for the detection of stopped vehicle at the chevron area in both day and night.

FIG. 15 illustrates the flow of the vehicle detection process 1500. For normal roadway, the vehicle detection process can be divided into two stages, day/night detection and vehicle detection. During the vehicle detection process for roadway, input image will first be processed to determine the day/night status of the traffic scene 1502 at regular interval. Next the image will be processed for the vehicle presence status at the ROI using either the vehicle-day-detection 1505 or the vehicle-night-detection 1506 technique, depending on the status (day or night) of the traffic scene. For detection of vehicle at the chevron area, the vehicle-chevron-detection technique will be used 1503 for both day and night conditions.

5.2.1 Region of Interest—ROI

During the vehicle detection process, ROI will be defined for each location where the traffic information is to be obtained. For the extraction of traffic parameters of a roadway, each ROI is generally coincided with each traffic lane as shown in FIG. 16. Each ROI consists of two regions, the profile-speed-zone PSZ and the vehicle-detection-window VDW as illustrated in FIG. 16. The VDW is to be overlapped onto the PSZ at the lower extreme. The function of the VDW is for the detection of the presence of vehicle on the window. The function of the PSZ is used for the extraction of the vehicle speed if a vehicle is detected at the VDW. For detection of stopped vehicle at shoulder or chevron, the ROI consists of only the VDW.

5.2.2 Day/Night Detection 1502

The detection of the day/night status of the traffic scene is based on two image parameters, namely the average gray level intensity $I_{ave}$ and the statistical variance of the pixels' intensity $V_{sts}$. These parameters are to be extracted from the pixels' intensities within the ROI. FIG. 17 shows a typical traffic scene during the night. As can be seen, during the night when there are vehicles on the road, the ROI will have a high variance of pixels' intensities due to the vehicle headlight and the dark background. FIG. 18 shows three typical pixels density distribution function for three traffic scene conditions. Function $f_3(g)$ of FIG. 18 shows a typically distribution of the pixel intensity for night scene. The two maxima found in $f_3(g)$ are attributed mainly to the pixels intensities of vehicle headlight and background. For night scene, where no vehicle within the ROI, the distribution function is resembled by $f_2(g)$, where most of the pixels' intensity are low. $f_1(g)$ depicts the pixels' intensity distribution function of ROI for a general day scene, where centered maxima is found. To distinguish the different pixels' intensity distribution two image parameters, namely the average gray level intensity $I_{ave}$ and the statistical variance of the pixels' intensity $V_{sts}$, are measured. For pixel within the ROI, $P_{ROI}(x,y)$, the two parameters are obtained as follows:

average intensity value: $I_{ave}$ $$I_{ave} = \frac{\sum_{for\ all\ x,y} I_{ROI}(x, y)}{N_{ROI}} \quad (1)$$

statistical variance: $V_{sts}$ $$V_{sts} = \frac{\sum_{for\ all\ x,y} (I_{ave} - I_{ROI}(x, y))^2}{N_{ROI}} \quad (2)$$

where $I_{ROI}(x,y)$ is the intensity value of pixel $P_{ROI}(x,y)$ within the ROI, $N_{ROI}$ is the total number of pixel within the ROI. In module 1502 of FIG. 15, the procedure for determining whether the input traffic scene is day or night is as follows:

1. Compute the two day/night detection parameters $I_{ave}$ and $V_{sts}$ within the ROI using Eqn. 1 and Eqn. 2, respectively.
2. IF $V_{sts} > V_{TH}$ OR ($I_{ave} < I_{TH}$ AND $V_{sts} < V_{TH}$)
   THEN label status of traffic scene as "NIGHT"
   ELSE label status of traffic scene as "DAY"

In step 2, if either one of the two conditions is fulfilled, then the status of the traffic scene is determined as night. The first condition "$V_{sts} > V_{TH}$" is met if the traffic scene has a high variance of pixel intensity within the ROI. This is likely to occur if vehicles are present within the ROI in a night scene. $V_{TH}$ is a constant threshold value dictates the minimum variance of the pixels' intensity of the ROI, with vehicle headlight, during the night. The second condition "$I_{ave} < I_{TH}$ AND $V_{sts} < V_{TH}$" is met if the traffic scene has a low average and low variance of pixel intensity within the ROI. This condition is likely to be met if no vehicle is present within the ROI in a night scene. $I_{TH}$ is a constant threshold value dictates the maximum average intensity of the ROI, with no vehicle headlight, during the night. If neither of the two conditions, in step 2, are met, this indicates that the traffic scene has a relatively higher $I_{ave}$ and lower $V_{sts}$, which is the likely condition for a day traffic scene.

5.2.3 Vehicle-Day-Detection 1505

In module 1505 of FIG. 15, for the vehicle-day-detection, the edge density information of the input image will be processed to distinguish between the complex texture of a vehicle from the homogeneous texture of the road surface for the detection of the presence of vehicles. One significant advantage of using the edge density information for the detection of vehicles is that there is no requirement of a reference image (background scene) since the detection process is performed using only edge information of the input image. Therefore, the problem of dynamic update of the reference image is eliminated. Consequently, no large memory space is needed for the storage of a reference image. Another advantage is that the edge density information of a traffic scene is less sensitive to the abrupt change of lighting condition such as shadow of passing cloud. This is because edge density is derived from the change of intensity values of neighbouring pixels within the same image, and there is no comparison to a reference image. The system using this approach is also very robust under different lighting conditions and change of lighting condition such as transition from day to night.

FIG. 19 shows the flow of the vehicle-day-detection process. From the input digitized image, the overall edge density $E_{VDW}$ of the VDW is computed at module 1901. First, the pixel values of the horizontal and vertical directional edges (EH(x,y), EV(x,y)) of the VDW is extracted from the original pixels values I(x,y) using the Sobel technique [1]. EH(x,y) and EV(x,y) is obtained as follows:

$$EH(x, y) = \left| \sum_{m=-1, n=-1}^{m=1, n=1} SH(m+1, n+1) * I(x+m, y+n) \right| \quad (3)$$

$$EV(x, y) = \left| \sum_{m=-1, n=-1}^{m=1, n=1} SV(m+1, n+1) * I(x+m, y+n) \right| \quad (4)$$

where SH and SV are the 3×3 matrices for the extraction of the horizontal and vertical edge, respectively.

$$SH = \begin{Bmatrix} -1 & -2 & -1 \\ 0 & 0 & 0 \\ 1 & 2 & 1 \end{Bmatrix}$$

$$SV = \begin{Bmatrix} -1 & 0 & 1 \\ -2 & 0 & 2 \\ -1 & 0 & 1 \end{Bmatrix}$$

Then the two directional edges are combined to generate the overall edge intensity E(x,y) at pixel (x,y):

$$E(x,y) = (1-K)*EH(x,y) + K*EV(x,y) \quad (5)$$

K is a constant value between 0 and 1. It is introduced here to give different weight to the horizontal and vertical components of the edges. By assigning K>0.5 enables the system to further minimize the horizontal edges of the shadow.

The overall edge intensity $E_{VDW}$ of the VDW is then obtained as follow:

for all pixel (x,y) within VDW $$\text{IF } (E(x,y) > E_T) \text{ THEN } E_{VDW} = E_{VDW} + E(x,y) \quad (6)$$

where $E_T$ is the threshold for the elimination of edges attributed to noise such as headlight reflection.

In module 1903, $E_{VDW}$ is compared with a reference value E_Ref$_{VDW}$, where E_Ref$_{VDW}$ is the average edge intensity of the VDW when no vehicle is present. Vehicle is then detected based on the following condition:

$$\text{IF } (E_{vdw} > \text{E\_Ref}_{vdw} + K_T) \text{ THEN vehicle present ELSE vehicle not-present} \quad (7)$$

where $K_T$ is the constant threshold. In an uncontrolled dynamic outdoor environment, the edge density of the background scene E_Ref$_{VDW}$ varies significantly. The variation depends on several factors such as, types of road surface texture, pixel resolution and zooming factor of the camera. Therefore, it is not practical to define a constant value for E_Ref$_{VDW}$. In our invention, we adopt an adaptive approach to dynamically update the value of E_Ref$_{VDW}$ base on the real-time image edge information. In the detection process, it is assumed that the road surface is relatively "smoother" than the texture of vehicle. If vehicle is not present, E_Ref$_{VDW}$ can be dynamically updated based on the following:

```
IF (vehicle NOT present){
    IF (E_Ref_VDW > E_VDW)
        THEN E_Ref_VDW = E_Ref_VDW - (E_Ref_VDW - E_VDW)/R_up
    ELSE IF (E_Ref_VDW < E_VDW AND E_VDW < E_Ref_VDW + K_T)
        THEN E_Ref_VDW = E_Ref_VDW + (E_VDW - E_Ref_VDW)/R_up
}                                                                                    (8)
``` where $R_{up}$ is a constant to control the rate of update. By initializing a relatively large value for $E\_Ref_{VDW}$, the above technique can dynamically adjust $E\_Ref_{VDW}$ to the actual edge density of the road surface. Subsequently, this process will continuously adjust the $E\_Ref_{VDW}$ to the actual road surface edge density.

The procedure for the use of edge information to detect the presence of vehicle as well as the process for the dynamic update of the background edge density is as follows:
1. For all pixels (x,y) within the VDW, compute the pixel edge E(x,y) from the original pixel intensity I(x,y) using Eqn. 3, 4 and 5.
2. Obtain the average edge density value of the VDW $E_{VDW}$ using Eqn. 6
3. Vehicle detection: compare $E_{VDW}$ with the reference $E\_Ref_{VDW}$ for the detection of vehicle using the Eqn. 7
4. Dynamic Update of $E\_Ref_{VDW}$ Using Eqn. 8.

5.2.3.1 Vehicle Headlight Removal

When using the edge density approach we are able to successfully minimize false detection of vehicle due to the reflection of vehicle headlight. This can be illustrated as shown in FIG. 20 and FIG. 21. FIG. 20 shows the image of a night traffic scene with prominent headlight reflection. However, when using the edge density information, as illustrated in FIG. 19, the reflected headlight is successfully eliminated. This is because the magnitude of edge is proportional of the gradient of intensity change between neighbouring pixels. Generally, the change in light intensity of the reflected headlight on the road surface is gradual hence the magnitude of the edge is small. In the vehicle detection process, the edges attributed by the headlight reflection can be minimised using Eqn. 6.

5.2.3.2 Moving shadow removal

In the present invention, the detection technique employed is able to minimize the moving shadow due to vehicle on the neighbouring lane. The elimination process can be illustrated in FIG. 22 to 24. FIG. 22 shows a traffic scene with moving shadow of vehicle. In FIG. 23, most part of the moving shadow has been eliminated. This is because magnitude of edge is proportional to the change of intensity value between neighbouring pixels. Since, the intensity values of those pixels within the shadow are constant, their edge density values, hence, minimized. Except that at the boundaries of the shadow where edges are present. To further reduce the remaining edges, more emphasis can be given to the vertical directional edge of the image using Eqn. 5. As shown in FIG. 24, the moving shadow is now successfully eliminated. This technique is also effective in minimizing the effect of stationary shadow of the surrounding structure.

5.2.4 Vehicle-Night-Detection

In the invention, the presence of vehicle in the night traffic scene is detected by detecting the vehicle headlight within the ROI. The presence of vehicle headlight, in turn, is derived from the intensity profile of the ROI. The generation of the intensity profile, along the length of the traffic lane, can be illustrated as shown in FIG. 25. The intensity-profile function $I_{ACC}(y)$ for each value of y (image row) is obtained by accumulating the total intensity value of the pixels at row y within the ROI. From the intensity profile function $I_{ACC}(y)$, the sharp "peaks" attributed to the headlight can be clearly identified. The peak attributed by the headlight reflection, on the other hand, is much smoother. Using this characteristic as the headlight signatures, the vehicle can be easily detected. The advantage of this technique is that the search for headlight only performs in one dimension, as compared to the direct approach which scan the ROI in both horizontal and vertical direction. Another advantage is that since the accumulated intensity value of each row, of the ROI, is used, the intensity profile generated is more stable and less susceptible to random noise. Two distinct parameters can be measured for the detection of the sharp peak which indicates the presence of vehicle. The two parameters are the intensity gradient $G_H$ and the "width" of the peak $W_H$. $G_H$ is defined as:

$$G_H(y) = \frac{dI_{ACC}(y)}{dy} \qquad (9)$$

For image processing, $G_H$ can be approximated as follow $$G_H(y) = \frac{I_{ACC}(y+S) - I_{ACC}(y)}{S} \qquad (10)$$

where S=1 is the pixel separation. $W_H$ is width of the "peak" which indicates the width of the headlight. The presence of a vehicle can then be detected based on the followings:

IF ($G_H(y) > G_T$ AND $W_H(y) < W_T$) THEN vehicle presence                                                   (11)

where $G_T$ and $W_T$ are constant threshold.

The procedure for the detection of vehicle at night is as follows:
1. Compute the accumulated intensity profile $I_{ACC}(y)$ within the ROI
2. Calculate the gradient $G_H$, using Eqn. 10, from the accumulated intensity profile $I_{ACC}(y)$
3. If a steep gradient is obtained at $Y=y_1$ where $G_H(y_1) > G_T$, then search for the local peak of $I_{ACC}(y)$ at $y_{max}$, and obtain $I_{ACCmax}$ and $W_H$
    To obtain $I_{ACmax}$:
    assign $y=y_1$
    WHILE ($I_{ACC}(y) < I_{ACC}(y+1)$) increase y by 1
    $I_{ACmax} = I_{ACC}(y)$ and $y_{max} = y$
    Obtain the width of the peak $W_H$ for ($I_{ACC}(y) > (I_{ACCmax} - K)$) where K is a constant which defines the minimum intensity different between the vehicle headlight and the background.
4. The presence of vehicle is detected using the Eqn. 11.

FIG. 26 shows the flow of the vehicle-night-detection process. In module 2601, the window-intensity-profile is generated. The presence of vehicle headlight is then detected by scanning through the profile 2603.

5.2.5 Chevron Vehicle Detection

Figure 1:
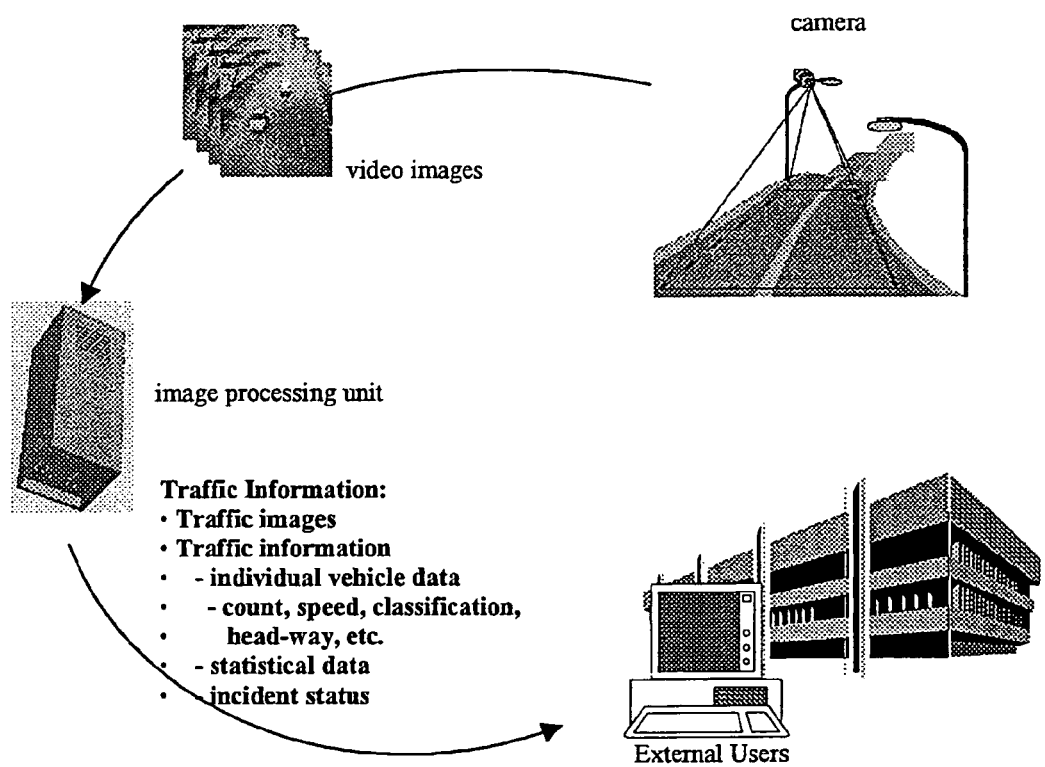
FIG. 1 shows the over view of video-based traffic monitoring system
Figure 2:
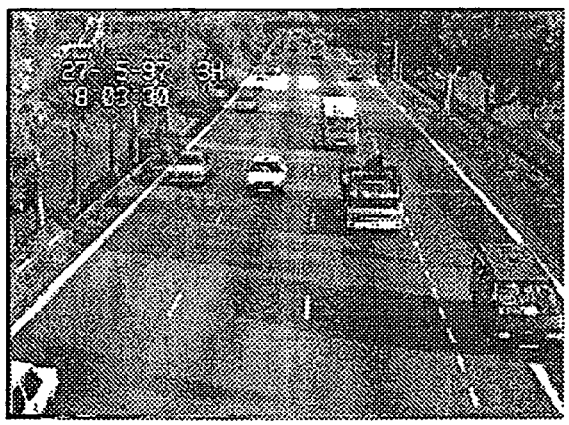
FIG. 2 illustrates the moving shadow due to the neighbouring vehicles
Figure 3:
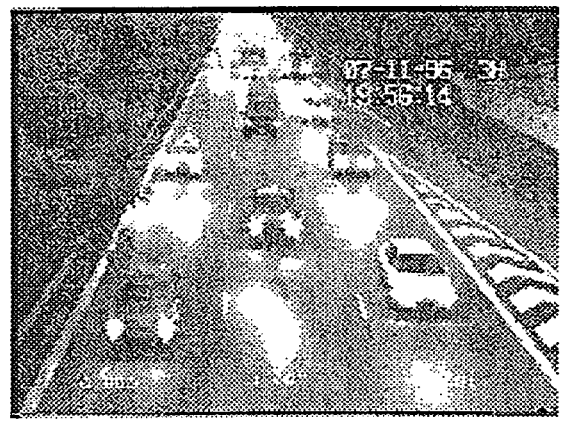
FIG. 3 illustrates the headlight reflection of vehicles
Figure 4:
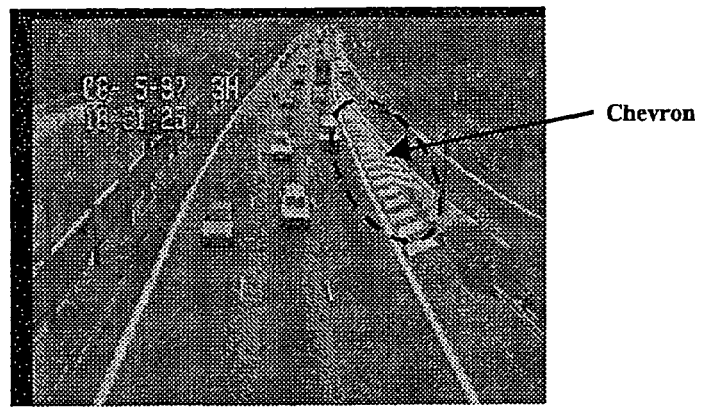
FIG. 4 illustrates the chevron area
Figure 5:
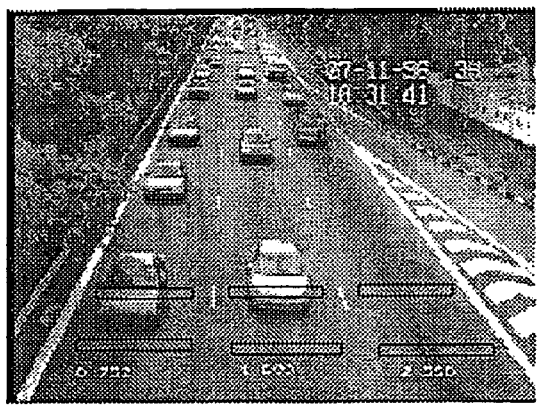
FIG. 5 illustrates the basic ideal of window technique
Figure 6:
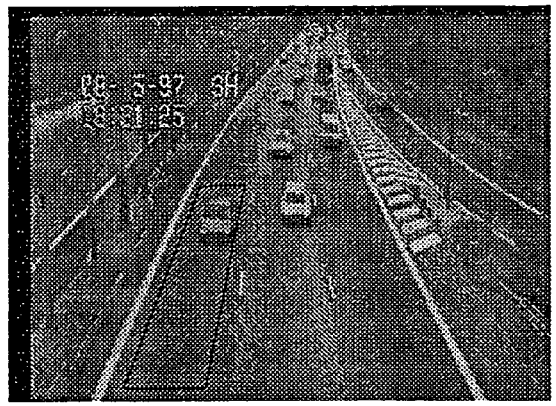
FIG. 6 illustrates the basic ideal of tracking technique

In the present invention, texture measurement is used to characterize the feature of the chevron region. Texture refers to the spatial variation of tonal elements as a function of scale. In the field of pattern recognition, various texture features can be computed statistically for the classification of images with distinct textural characteristic. Since digital image of the same land cover class usually consists of a spatial arrangement of gray levels which are more homogeneous within than between land cover of different classes. The idea of using the texture information for the detection of vehicle is to characterize the ROI, within the chevron area, using texture features. Such that the texture of the ROI, with the present of vehicle, can be distinguished from the unique texture of the ROI when no vehicle is present (reference texture). As can be seen in FIG. 4, the chevron region consists of black and white stripes, therefore it can be characterized by its unique texture. In the present invention, the gray level co-occurrence matrix (GLCM) for the extraction of the texture features of the ROI is employed [2].

The computation of textural measurement, of the ROI, using the GLCM approach involves two steps. First, the variations of intensities of the neighbouring pixels, within the ROI, are extracted using a co-occurrence matrix. This matrix contains frequencies of any combination of gray levels occurring between pixel pairs separated by a specific distance and angular relationship within the window. The second step is to compute statistics from the GLCM to describe the spatial textural information according to the relative position of the matrix elements. Various texture measurements can be computed from the co-occurrence matrix. In our invention, for the detection of vehicle within the chevron area, two texture measurements, namely the angular second moment (ASM) and contrast (CON) are used. Let $I_{ROI}(x,y)$ be the intensity function within the ROI defined at location (x,y), and let Q be the number of quantized intensity levels. $P_{ij}$ represents the matrix entry denotes the number of occurrences of two neighbouring pixels within the region, one with intensity level i and the other with intensity level j. The two neighbouring pixels have to be separated by a displacement vector $\underline{D}$.

$$P_{i,j}(\underline{D}) = \#\{[(x_1, y_1),(x_2, y_2)] \mid I(x_1, y_1)=i, I(x_2, y_2)=j, [(x_1, y_1)-(x_2, y_2)]=\underline{D}\} \quad (12)$$

Where # denotes the number of elements in the set. The two computation parameters, Q and $\underline{D}$, are selected as:
Q=128
$\underline{D}$: magnitude of $\underline{D}$=2, with vertical orientation ($\theta$=90°)
The texture measurements are obtained as follows:

$$ASM = \sum_{i=1}^{Q}\sum_{j=1}^{Q} P_{i,j}^2 \quad (13)$$

$$CON = \sum_{i=1}^{Q}\sum_{j=1}^{Q} (i-j)^2 * P_{i,j} \quad (14)$$

Then the texture measurements are match with that of the background texture measurement (ROI with no vehicle present). If the measured parameters are "similar" to the background texture measurements, then the state of the ROI is identified as vehicle not present. If the extracted feature is "different" to the background features, then the state of the ROI is identified as vehicle present. The procedure used in the proposed system is as follows:
1. From all pixels (x,y), within the ROI, generate the gray level co-occurrence matrix (GLCM) using Eqn. 12.
2. Obtained input texture features: ASM and CON for the ROI using Eqn. 13 and Eqn. 14, respectively.
3. Compare input texture features with background features (no vehicle): $ASM_B$, $CON_B$
   If ($|ASM_B-ASM|<ASM_{Th}$ AND $|CON_B-CON|<CON_{Th}$)
   THEN vehicle not present
   Else vehicle present
4. If vehicle not present, update background features:

$$ASM_B = ASM_B + (ASM - ASM_B)/R_{ASM}$$

$$CON_B = CON_B + (CON - CON_B)/R_{CON}$$

$ASM_{Th}$ and $ASM_{Th}$ are constant threshold values. $R_{ASM}$ and $R_{CON}$ are constant parameters which define the rate of update for the background feature, $ASM_B$ and $CON_B$, respectively. FIG. 27 shows the flow of the image processing process for vehicle detection at the chevron area.

5.3. Traffic Parameters Extraction

The extraction of traffic parameters can be separate into two parts, the extraction of traffic data and the detection of traffic incident. FIG. 28 shows the flow of the traffic parameters extraction process. In module 2801, we identify the state of VDW into one of the four different states at each processing frame. These four states are, Activate, De-activate, Active and Idle. When a vehicle reaches the VDW, the window will be in Activate state. After the Activate mode, while the vehicle still presents in the succeeding frames, then the VDW will be in Active state. If the vehicle leaves the VDW, that is if the preceding frame is Active and the vehicle is not present in current frame, then the VDW is in De-activate state. If vehicle is not present in the preceding and current frame, the window is in Idle state.

When the VDW is in the Activate state, that is when a vehicle first activates the VDW, then the vehicle counter will increase 2806. The vehicle speed is then obtained using the profile-speed extraction technique 2807. While the VDW is in Active mode, the number of frames which the vehicle presents in the window, present_frame_counter, will be increased. Hence, to determined the length of time when the vehicle presents in the VDW. At 2808, when the vehicle leaves the VDW, the vehicle length will be calculated from three parameters, present_frame_counter, vehicle_speed and frame_rate. Frame_rate is the number of processed frame per second for each video input. Together with the frame-rate, the present_frame_counter also used to calculate the average_time_occupancy of the traffic lane for every interval of time.

5.3.1 Profile-Speed-Extraction

FIG. 29 shows the flow of the profile-speed-extraction process. First the edge-profile within the speed-profile-zone SPZ, is generated 2901. FIG. 30 and FIG. 31 show the generation of the edge-profile functions within the SPZ for two consecutive frames f and f+1. Similar to the intensity-profile as described in the section of night-detection, the edge-profile along the length of the SPZ is obtained from the average edge-density $E_{AVE}(y)$ of each row of pixels. The edge-profile is used because it is more stable than the intensity profile since it is not susceptible to variation of ambient lighting condition. If the VDW is in the Activate state, convolution is performed between the two edge-profile functions obtained from consecutive frames at module 2904. FIG. 32 shows the result of the convolution. At an offset distance dx from the origin, the convolution has a maximum peak which can be translated to the distance which the vehicle has travelled from frame f to frame f+1. Knowing the frame rate and dx, the velocity of the vehicle can be obtained.

The procedure for the speed extraction is as follows:
1. For all pixels (x,y), within the PSZ, obtained the edge values E(x,y) using Eqn. 3, 4 and 5.
2. Generate edge-profile:
   for all y: for each row of pixels within the PSZ
   obtained the average edge value of row y: $E_{AVE}(y|frame=f)$ $$E_{AVE}(y | frame = f) = \frac{\sum_{x=1}^{N(y)} E(x, y)}{N(y)} \quad (15)$$

3. If state of VDW is Activate→compute speed:
   3a: perform convolution for functions $E_{AVE}(y|frame=f)$ and $E_{AVE}(y|\text{frame}=f-1)$:

$$C(z) = \sum_{\text{for all } y} E_{AVE}(y|\text{frame}=f) * E_{AVE}(y-z|\text{frame}=f-1) \quad (15)$$

3b: for all z, find maximum of C(z), $C_{max}(z)$:

→vehicle speed$\propto z_{max}|C(z_{max})=C_{max}(z)$

4. Update $E_{AVE}(y|\text{frame}=f-1)$:
   for all y: $E_{AVE}(y|\text{frame}=f-1)=E_{AVE}(y|\text{frame}=f)$ 5.3.2 Incident Detection The traffic incident is derived from the traffic data obtained. The types of incidents include congestion, stopped vehicle (on traffic lane or shoulder) and wrong way traffic. For the detection of congestion:

IF (speed<lower_speed_limit AND
       occupancy>upper_occupancy_limit) THEN traffic
       incident=congestion For the detection of stopped vehicle:

IF (speed==0 AND
       vehicle_stopped_time>stopped_time_limit)
       THEN traffic incident=stopped vehicle For the detection of wrong way traffic:

IF (velocity<0) THEN traffic
       incident=wrong_way_traffic

The detection of the wrong way traffic is derived from the velocity (speed) obtained from the profile-speed extraction process. If a vehicle is travelling in the opposite direction, opposing the traffic flow direction, the convolution output of the profile-speed extraction process will have a negative offset of dx. Therefore the sign of the offset can be used as an indication of the vehicle's direction.

REFERENCES

[1] Rafael C Gonzalez and Richard E Woods, *Digital Image Processing*, Addison-Wesley Publishing Company, 1992.
[2] Danielle J Marceau, Philip J Howarth, Jean-Marie M Dubois and Denis J Gratton, "Evaluation of the Grey-Level Co-Occurrence Matrix Method For Land-Cover Classification Using SPOT Imagery", *IEEE Transactions on Geoscience and Remote Sensing*, Vol. 28, No. 4, July 1990.

The invention claimed is:

1. A method of detecting a vehicle within a chevron area in a traffic monitoring system, the method comprising the steps of:
   applying a gray level co-occurrence matrix for the extraction of texture features of a region of interest;
   calculating two texture measurements using the gray level co-occurrence matrix, the two texture measurements comprising an angular second moment and a contrast;
   comparing the angular second moment ASM and the contrast CON, with a background angular second moment $ASM_B$ and a background contrast $CON_B$, the background angular second moment and background contrast measured when no vehicle is present,); and
   determining if $(|ASM_B-ASM|>ASM_{TH}$ AND $|CON_B-CON|<+(CON_{Th})$,
   wherein if $(|ASM_B-ASM|>ASM_{TH}$ AND $|CON_B-CON|<+(CON_{Th})$, then a vehicle is not present.

2. A method as claimed in claim 1, further including the step of updating background features if a vehicle is not present.

3. A method of calculating vehicle speed in a traffic monitoring system, the method comprising the steps of:
   using convolution between two edge-profiles for the extraction of the vehicle speed; and
   obtaining edge values E(x,y) for all pixels (x,y), within a profile speed zone according to:

$$E(x, y) = (1-K)*EH(x, y) + K*EV(x, y)$$

wherein $$EH(x, y) = \left| \sum_{m=-1, n=-1}^{m=1, n=1} SH(m+1, n+1)*1(x+m, y+n) \right|$$

and $$EV(x, y) = \left| \sum_{m=-1, n=-1}^{m=1, n=1} SV(m+1, n+1)*1(x+m, y+n) \right|$$

and wherein SH and SV are 3×3 matrices for the extraction of the horizontal vertical edge, respectively.

4. A method of calculating vehicle speed in a traffic monitoring system, the method comprising the steps of:
   using convolution between two edge-profiles for the extraction of the vehicle speed; and
   generating an edge-profile in accordance with $$E_{AVE}(y)|\text{frame}=f) = \frac{\sum_{x=1}^{N(y)} E(x, y)}{N(y)}$$

wherein $E_{AVE}(y)$ is the average edge-density of each row of pixels.

5. A method as claimed in claim 4, further including the step of:
   determining speed if the state of a vehicle detection window is Activate.

6. A method as claimed in claim 5, wherein the convolution used is by performing convolution for functions $E_{AVE}(y|\text{frame}=f)$ and $E_{AVE}(y|\text{frame}=f-1)$ and $$C(z)=\Sigma E_{AVE}(y|\text{frame}=f)*E_{AVE}(y-Z|\text{frame}=f-1)$$

for all y.

7. A method as claimed in claim 6 further including the step of, for all z, finding a maximum of C(z), $C_{max}(Z)$, wherein:
   vehicle speed $\alpha Z_{max}\backslash C(Z_{max}=C_{max}(Z)$.

8. A method as claimed in claim 7 further including the step of updating $E_{AVE}(y|\text{frame}=f-1)$;
   for all y: $E_{AVE}(Y|\text{frame}=f-1)=E_{AVE}(y|\text{frame}=f)$.

9. A method as claimed in claim 8, further comprising the step of using a polarity sign of an offset obtained from the convolution method.

10. A method as claimed in claim in 9, wherein a positive polarity indicates that the vehicle is travelling in a direction of traffic flow, and wherein a negative polarity indicates that the vehicle is travelling in a direction opposite to the direction of traffic flow.

* * * * *